Patented May 2, 1933

1,906,761

UNITED STATES PATENT OFFICE

MAX LUTHY, OF ST. LOUIS, AND BENJAMIN E. THOMAS, OF WEBSTER GROVES, MISSOURI, ASSIGNORS TO MONSANTO CHEMICAL WORKS, OF ST. LOUIS, MISSOURI, A CORPORATION OF MISSOURI

PURIFICATION OF ORGANIC ACID CHLORIDES

No Drawing.  Application filed March 29, 1930. Serial No. 440,158.

This invention relates to the manufacture and purification of acid chlorides and it has particular application to the manufacture of this class of products having no contaminating acid impurities.

One object of the present invention is to provide a process for treating the acid chlorides whereby acidic impurities may be removed therefrom.

Another object of the invention is to provide a process by which one is enabled to produce a pure, stabilized product which may be stored without decomposition and which does not attack the ordinary metal containers.

Many of aliphatic anhydrides may be separated from their various impurities by distillation. On the other hand, certain of the anhydrides, as well as acid chlorides, and particularly the aromatic sulphochlorides, such as paratoluene sulphochloride, are not easily separated from acid impurities with which they are commonly associated. Moreover the impurities which are present, particularly in the acid chlorides, are such as to interfere with storage and transportation of the product because of their corrosive action on metallic containers, as well as their tendency to induce decomposition of the product.

Aromatic sulphochlorides may be prepared conveniently by reacting an aromatic hydrocarbon with chlorsulphonic acid. Regardless of the process which is employed for effecting the sulphonation the resulting product contains among others, small amounts of sulphuric acid and hydrochloric acid impurities. Inasmuch as these impure products cannot be stored in metallic containers and furthermore inasmuch as storage results in decomposition thereof, it has been customary in many cases for the chemical manufacturers to convert the acid chlorides into other products, such, for example, as the acid amide or the esters. The disadvantage of this procedure should readily be apparent to anyone and is well recognized by those skilled in the art, one disadvantage being that the esterification or amidation produces a product having an accumulated amount of impurities and secondly these impurities consume additional quantities of reagents.

According to the present invention acid chlorides are treated with an inorganic basic composition whereby the acidic impurities are caused to react and are thereby separated, leaving the pure anhydride or acid chloride. The invention is based on the discovery that contrary to prevailing belief inorganic basic compositions do not react readily with organic anhydrides or acid chlorides even in the presence of small amounts of water, whereas they react rapidly with the acid compositions even in an acid anhydride or acid chloride medium.

For this purpose various inorganic basic materials may be employed, such as the hydroxides, carbonates, but preferably the oxides of metals such as calcium, barium, magnesium, zinc, lead, copper, aluminum and similar metals. The acidic impurities react or otherwise combine therewith resulting in the formation of the corresponding salts, without combining with the acid chloride or anhydride. In lieu of the bases enumerated above one may employ the carbonates of sodium or potassium, either in solid form or as a concentrated aqueous solution. Inferior results are obtained with the alkali metal hydroxides, moreover low reaction temperatures must be maintained.

The oxides afford the advantage of dehydrating the acid mixture. The same effect is, of course, produced by the salts which are formed since in most instances they are hygroscopic or possess a capacity for removing water by reason of their waters of crystallization.

This unexpected selective reactivity of a basic material with the acid impurities in acid chloride mediums enables one to prepare a product which can be stored in metal containers and which can thus be purified without difficulty. It is surprising that the acid chloride does not react with the base, particularly in the presence of moisture, since these materials are generally considered to be distinctly acidic and highly reactive products.

By applying the present invention to acid chloride mixtures one is able to obtain practically theoretical yields of the purified product even though the mixture of the base and the impure material be heated to elevated temperatures. The fact that the base reacts very slowly, if at all, with the acid chlorides, even at elevated temperatures whereas it reacts very rapidly with acid impurities, makes the process particularly suited for many purposes in that it affords complete neutralization and removal of acidic impurities without sacrificing yield.

Examples of the application of the principles of this invention are hereinafter set forth.

*Example 1.*—Acetyl chloride may be separated of traces of acetic and hydrochloric acids advantageously, at room temperature by thoroughly agitating a small amount of finely divided calcium oxide or magnesium oxide in the liquid and thereafter filtering the purified acetyl chloride product.

*Example 2.*—Benzoyl chloride may be freed of any benzoic acid or hydrochloric acid impurities by suspending an amount of calcium oxide in the liquid, after which the benzoyl chloride is distilled or decanted from the benzoic or hydrochloric acid salt.

*Example 3.*—Phthalyl chloride containing phthalic acid and benzoic acid impurities is agitated in molten condition with a suspension of finely divided calcium oxide after which the phthalyl chloride is filtered from the reacted impurities in the usual manner.

*Example 4.*—Paratoluene sulphochloride containing hydrochloric and sulphuric acid impurities is mixed with finely divided calcium oxide or hydroxide and agitated vigorously at between 60° to 70° C. for a few minutes, after which the reacted impurities may be allowed to settle and the product filtered therefrom.

*Example 5.*—Copper oxide, zinc oxide, lead oxide or aluminum oxide, may be substituted for the calcium oxide or hydroxide in Example 4.

In certain instances a manufacturer is confronted with the separation and purification of acid chlorides which contain small amounts of water as well as acid impurities. The presence of the water is objectionable since it interferes with the handling and transportation of the product and may be instrumental in inducing decomposition or otherwise impairing the stabilization and reactivity of the desired product. In other instances a mixture of acid chloride homologues containing aqueous and acidic impurities are to be separated from each other. This separation of homologues can be effected only with difficulty because of the presence of the water and acid. The present invention is peculiarly well suited to the separation and purification of such materials as will be apparent from the following examples.

*Example 6.*—A mixture of ortho toluene sulphochloride and para toluene sulphochloride which is obtained by the chlorsulphonation of toluene and which includes among its impurities hydrochloric acid, sulphuric acid, toluene sulphonic acid and water, may be treated advantageously by mixing finely divided calcium oxide therewith while maintaining the same at about 35–45° C. Within a few minutes the calcium oxide will have reacted with the acids to form the corresponding salts which are solid and may be filtered from the liquid mixture without difficulty. The water combines with the excess calcium oxide and is absorbed or otherwise removed by the hygroscopic inorganic lime salts. The fact that the corrosive constituents have been removed from the ortho and para mixture enables one to obtain a better separation of the two isomers than would otherwise be possible, as well as to obtain products which are neutral and can be stored for prolonged periods without evidence of decomposition—a result which heretofore has not been enjoyed.

*Example 7.*—Barium oxide, lead oxide, aluminum oxide or magnesium oxide may be substituted in lieu of the calcium oxide in Example 6.

The quantity of inorganic base employed in the examples hereinafter set forth depends upon the amount of acid impurities to be removed. In general only a slight excess over that theoretically required to combine with the acid impurities need be employed. The time of reaction can be varied by methods well understood to those skilled in the art, for example by adjusting the temperature of the reaction mixture or by adding a substantial excess of base. The neutralization requires but a few minutes to complete itself in the case of inorganic acid impurities.

From the examples hereinabove set forth, as well as those modifications enumerated, it should be apparent to those skilled in the art that the present invention although peculiarly adapted to the purification of aromatic sulphochlorides, such as paratoluene sulfochloride, is generally applicable to the purification of any acid chlorides. The products so formed are not only free of the acid impurities, but may in the purified condition be stored advantageously and without suffering decomposition. When the acid chlorides, particularly aromatic sulfochlorides are to be cast into a container it is desirable to employ metal containers which do not expose an electrolytic couple. This precaution is not of paramount importance when the treated product is stored in flake form. The materials can be stored safely and for indefinite periods of time in iron or tin containers without evidence of decomposition. These results are in decided contrast with results obtained with the untreated product, which cannot be stored in metal containers because of the corrosive effect thereon, and moreover undergoes decomposition which results in a substantial loss of product.

In its broad aspects, therefore, the present invention contemplates the treatment of materials of the acid chloride class for the purpose of removing the acid impurities, which consist in reacting the material with a basic composition, preferably a strong inorganic base, whereby the acid materials react and the acid chloride product may be separated therefrom by filtration, decantation or distillation. It should be noted that this treatment in many instances may be applied even in the presence of water, particularly when the treatment is conducted expeditiously. The term "inorganic basic material" as employed in this application contemplates metallic compounds, and it is not to be construed to include amines including ammonia or ammonium hydroxide.

We claim:

1. The method of purifying organic materials of the acid chloride class containing acid impurities resulting from the production of said organic materials, which consists in treating the same with an inorganic basic material.

2. The steps which consist in treating organic materials of the acid chloride class containing acid impurities resulting from the production of said organic materials with an inorganic basic material and separating the treated product from the reacted inorganic material.

3. The method of purifying crude organic materials of the acid chloride class containing acid impurities, which consists in treating the crude material with an inorganic basic composition selected from the group consisting of the following: the oxides, hydroxides and carbonates of calcium, barium, magnesium, zinc, lead, copper aluminum and carbonates of sodium and potassium, and separating the reacted inorganic material.

4. The method of purifying aromatic sulphochlorides containing acid impurities resulting from the production of such compounds which consists in treating the same with an inorganic basic material.

5. The method of purifying organic materials of the acid chloride class containing acid impurities resulting from the production of said organic materials, which consists in suspending an inorganic basic material therein, causing the same to react with the acid impurities and separating the treated product from any insoluble residue.

6. The method of purifying crude organic products of the acid chloride class containing acid impurities which consists in suspending a finely divided inorganic basic material in the crude product, allowing the acid impurities to react with the basic material and separating the treated product from any insoluble residue.

7. The method of purifying paratoluene sulphochloride containing acid impurities resulting from the production of such compound which consists in suspending a finely divided calcium oxide in the sulphochloride while maintaining the same in a liquid condition and subsequently separating the treated sulphochloride from any solid residue.

8. The method of purifying organic materials of the acid chloride class containing moisture and acid impurities resulting from the production of said organic materials, which consists in treating the same with an inorganic basic material whereby the acid impurities react to form inorganic salts and thereafter separating any solid residues from the liquid product.

9. The method of purifying organic sulphochlorides containing small amounts of inorganic acid impurities which consists in treating the same with an inorganic basic material whereby a solid inorganic residue is formed and separating the liquid material from such residue.

10. The method of purifying organic sulphochlorides containing small amounts of inorganic acid impurities and moisture, which consists in treating the same with an inorganic alkaline earth basic material whereby a solid residue forms and separating the liquid material from said residue.

11. In the processing of materials of the acid chloride class the step which consists in subjecting the same to the action of an inorganic basic oxide.

12. In the processing of acid chlorides the step which consists in treating the same with an inorganic basic oxide.

13. In the processing of the aromatic sulphochlorides the step which consists in treating the same with an inorganic basic oxide.

14. In the processing of ortho and para toluene sulphochlorides containing moisture and acid impurities the step which consists in treating the same with an inorganic basic oxide.

15. The steps which consist in treating a mixture of ortho and para toluene sulphochloride containing moisture and acid impurities resulting from the production of such compounds with an inorganic basic oxide whereby the moisture and acid impurities are caused to react therewith, separating the residue resulting from such treatment and adjusting the temperature of the resulting mixture whereby the para compound is separated from the ortho compound by crystallization.

16. A method of removing acidic impurities from an organic sulphochloride which comprises mixing the sulphochloride while in liquid condition with an inorganic metallic basic compound capable of reacting with the impurities to form inorganic metallic salts of said basic compounds and separating the solid reaction product so formed from the acid chloride product.

17. A method of removing acidic impurities from organic acid chlorides. which comprises mixing the acid chloride with an alkaline earth metal base composition capable of reacting with the acidic impurities to form the corresponding alkaline earth metal salt and thereafter separating the salt so formed from the acid chloride product.

18. The method which comprises treating organic sulphochlorides containing acid impurities, while in a liquid state, with an inorganic basic composition selected from a group consisting of the following: the oxides, hydroxides and carbonates of calcium, barium, magnesium, zinc, lead, copper, aluminum and carbonates of sodium and potassium and subsequently separating the treated liquid sulphochloride from the mixture.

19. The method as defined in claim 18 and further characterized in that the basic composition is introduced in a finely divided solid form and agitated thoroughly with the liquid sulphochloride before the liquid sulphochloride is separated from the mixture.

20. The method as defined in claim 18 and further characterized in that the sulphochloride is an aromatic sulphochloride.

21. The method of treating aromatic sulphochlorides while in a liquid state which consists in subjecting the same to the action of an alkaline earth metal oxide and subsequently separating the liquid sulphochloride from the mixture.

In testimony whereof we affix our signatures.

MAX LUTHY.
BENJAMIN E. THOMAS.

CERTIFICATE OF CORRECTION.

Patent No. 1,906,761. May 2, 1933.

MAX LUTHY, ET AL.

It is hereby certified that error appears in the printed specification of the above numbered patent requiring correction as follows: Page 1, line 15, after "of" insert the word "the"; page 3, line 45, after "copper" insert a comma; and line 78, claim 8, after "the" insert "organic"; page 4, line 7, claim 17, strike out the period after "chlorides" and insert a comma; and that the said Letters Patent should be read with these corrections therein that the same may conform to the record of the case in the Patent Office.

Signed and sealed this 11th day of July, A. D. 1933.

M. J. Moore.

(Seal) Acting Commissioner of Patents.